Sept. 11, 1956  O. M. MARTINSON ET AL  2,762,540
METHOD AND MEANS FOR STRINGING BEADS
Filed April 24, 1952  7 Sheets-Sheet 1

FIG. 1

Oscar M. Martinson
Maximilian R. Speiser
INVENTORS

Sept. 11, 1956   O. M. MARTINSON ET AL   2,762,540
METHOD AND MEANS FOR STRINGING BEADS
Filed April 24, 1952   7 Sheets-Sheet 2

Fig. 2

INVENTORS
OSCAR M. MARTINSON
MAXIMILIAN R. SPEISER

Sept. 11, 1956    O. M. MARTINSON ET AL    2,762,540
METHOD AND MEANS FOR STRINGING BEADS
Filed April 24, 1952    7 Sheets-Sheet 3

Oscar M. Martinson
Maximilian A. Speiser
INVENTORS

Sept. 11, 1956 O. M. MARTINSON ET AL 2,762,540
METHOD AND MEANS FOR STRINGING BEADS
Filed April 24, 1952 7 Sheets-Sheet 4

Oscar M. Martinson
Maximilian R. Spenser
INVENTORS

Sept. 11, 1956   O. M. MARTINSON ET AL   2,762,540
METHOD AND MEANS FOR STRINGING BEADS
Filed April 24, 1952   7 Sheets-Sheet 5

Oscar M. Martinson
Maximilian R. Spell
INVENTORS

United States Patent Office 2,762,540
Patented Sept. 11, 1956

2,762,540

METHOD AND MEANS FOR STRINGING BEADS

Oscar M. Martinson and Maximilian R. Speiser, New York, N. Y., assignors to S. & M. Products Co., Inc., New York, N. Y., a corporation of New York Application April 24, 1952, Serial No. 284,132

14 Claims. (Cl. 223—48)

This invention relates generally to automatic machinery, and more particularly to an improved bead stringing machine capable of automatically stringing a plurality of beads upon a length of string or thread.

It is among the principal objects of the present invention to provide a device wherein individual beads may be threaded upon a string in rapid succession, by mechanically rotating the beads in such a manner that the entire spherical surface is presented to the end of a needle so that an entrance to the hollow channel in the bead may be quickly found, whereby the same may be threaded upon a needle connected to the string.

Another object of the invention herein lies in the provision of a device of the class described in which a large number of beads may be simultaneously threaded upon a plurality of needles, the needles in turn aligning with a master needle in rapid succession, whereby the beads engaged by the first mentioned needles may be quickly transferred thereto to make up a string of beads.

Another object of the invention lies in the provision of a bead stringing device incorporating means for automatically regulating the number of beads upon a given string, so that successive strings of beads strung by the machine may be of uniform size and length.

Another object of the invention lies in the provision of means for automatically transferring a completed string of beads to a holding device to permit another length of string to be positioned in a bead receiving position.

A further object of the invention lies in the provision of a bead stringing machine of the class described in which there is incorporated means for automatically repositioning in succession a plurality of strings to a bead receiving disposition, so that a large number of strings of beads may be threaded in a completely automatic manner, the device continuing to function without manual control as long as desired.

A further object of the invention lies in the provision of a bead stringing machine of the class described having incorporated therein provision for detecting and eliminating defective beads prior to their reaching a position wherein the operation of the machine is effected.

Still another object of the invention lies in the provision of a bead stringing machine possessing the above mentioned structure in which the cost of manufacture may be of a reasonably low order, with consequent wide sale, distribution and use.

A further object of the invention lies in the provision of a novel method for stringing beads upon a thread at a high speed.

A feature of the invention lies in the fact that it may be readily adapted for use with a wide variety of sizes of beads.

Another feature of the invention lies in the fact that the device is capable of extremely high speed in stringing and forming individual strings of beads. When running at full speed, the device is capable of completing an entire string of beads in a matter of a few seconds.

These objects and features, as well as other incidental ends and advantages, will become more clearly apparent during the course of the following disclosure, and be pointed out in the appended claims.

On the drawings, to which reference will be made in the specification, similar reference characters have been employed to designate corresponding parts throughout the several views.

In accordance with the invention, the device, generally indicated by reference character 20 comprises broadly (see Figure 1): a base or frame element 22, bead supply means 24, bead rotating means 26, bead transfer means 28, bead rejection means 29, a master needle element 30, bead counting means 32 (see Figure 2), bead string transfer means 34, bead string counting means 35, bead string retaining means 36, master needle element restring means 37 and control means 40.

The frame or base element 22 may be of any suitable construction and includes a bottom member 44, upright support members 46, and a plurality of mounting plates 48 upon which the various components comprising the device are mounted. Although in the embodiment shown on Figure 1 the device is adapted to rest upon a floor, smaller embodiments (not shown) may be so constructed that the frame element may be appreciably smaller, so that it may rest upon the surface of a table or other elevated supporting means.

The bead supply means 24 includes a hopper member 50 covering a portion of the needle plate 52. Single beads drop into the holes of needle plate 52 and are carried out of the hopper as the needle plate 52 rotates. As may be best seen on Figure 3, the needle plate 52 is driven by a gear reduction means 54 which includes a component (not shown) which permits intermediate stepped movement, the structure being usually referred to in the art as a "Geneva" movement. The motion is imparted by means of a prime mover 56 which drives a belt 55, a shaft 57, and the advancement mechanism disposed within a housing 53 (see Figure 7).

Figures 3, 4:
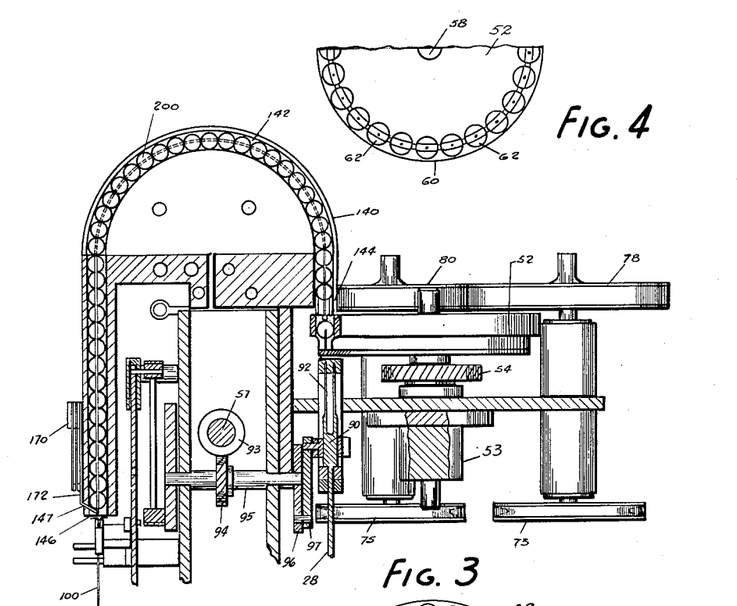
Figure 3 is a fragmentary enlarged vertical sectional view as seen from the plane 3—3 on Figure 2.
Figure 4 is a fragmentary plan view of the needle plate which comprises a part of the embodiment.
Figure 5:
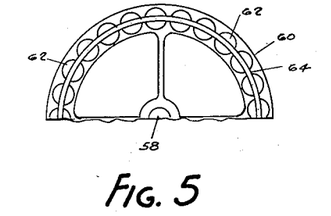
Figure 5 is a bottom plan view of the needle plate.
Figures 6, 7:
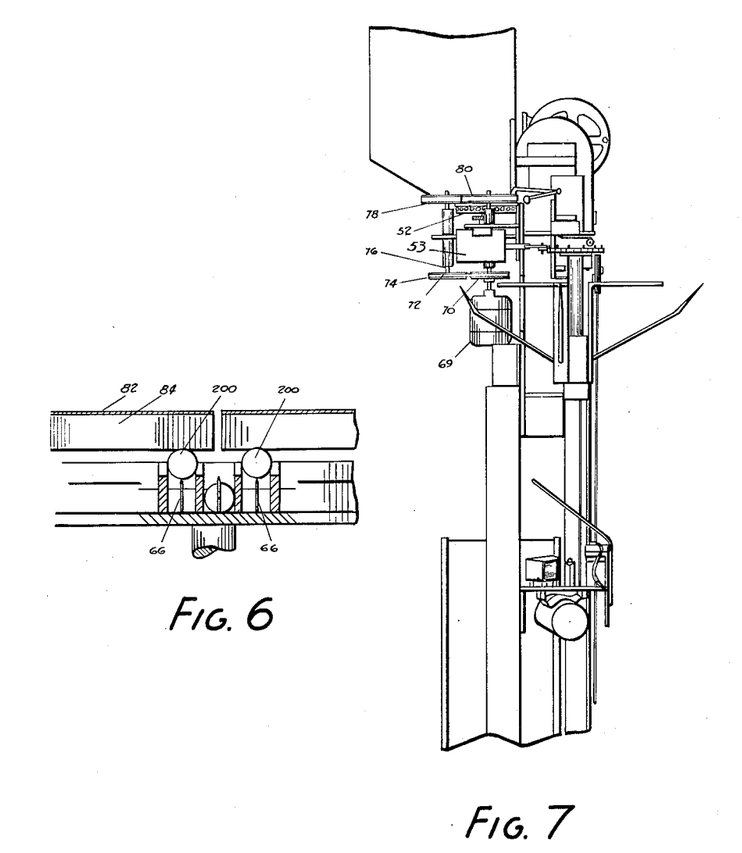
Figure 6 is a fragmentary enlarged sectional view showing the engagement of individual beads with the needles of the needle plate.
Figure 7 is a side elevational view of the embodiment.

Referring to Figures 4, 5 and 6, it may be observed that the needle plate 52 is generally circular in configuration, including a central bearing member 58, an outer periphery 60, and a plurality of equally sized bores 62 which correspond to the size of the beads 200 employed. Passing through the locus of the centers of the bores 62 is a needle support ring 64 upon which are mounted a plurality of primary or mounting needles 66. As may be seen on Figure 6, the needles 66 are so positioned that they extend upwardly coincidental with the axis of the bores 62 and terminate at a point spaced from the upper terminals of the bores 62 a distance slightly greater than the radius of the individual beads 200.

The bead rotating means 26 (see Figures 3 and 6) serves to rotate the individual beads 200 while disposed in the bores 62 simultaneously with the movement of the needle plate 52 about the central bearing 58 thereof. Since in any given position the beads 200 will be rotated about a given horizontal axis, the rotation of the needle plate will serve to periodically change the direction of the axis of rotation so that within a relatively short time a sufficient amount of the entire surface of the bead 200 will be presented to the end of the needle 66 to enable the same to enter the bore (not shown) which extends through the bead along a diameter thereof. This effect occurs because of the fact that the bead rotating means 26 is mounted for rotation about two vertically disposed axes, neither of which is coincident with the axis extending through the bearing 58.

The means 26 is driven by a separate prime mover 69 (see Figure 7), which drives a pulley 70, a belt 72, a pulley 74 on a shaft 76 and pulleys 73 and 75 through a belt (not shown). Because of the use of the separate prime mover 69, the discs 78 and 80 may be driven at a relatively high speed, thus assuring a large amount of rotation over a relatively small interval of time. The discs 78 and 80 are substantially similar, each including a relatively stiff base member 82 beneath which is positioned a resilient member 84, sufficiently soft to deform under contact with a bead 200 and having a high coefficient of friction to assure proper rotation.

With continued rotation, all of the beads disposed on the needle plate 52 are either positioned as the central bead 200 shown on Figure 6 or are ejected from the needle plate by the rejection means 29, as will become more clearly apparent at a point later in the disclosure.

Referring to Figure 3, there may be seen a bifurcated fork member 90 having tines 92 adapted to elevate the individual beads 200 from the needles 66 when a bore 62 is positioned thereabove.

The fork member 90 is mounted for vertical reciprocation upon the support member 91, the member being driven by the prime mover 56. On Figure 3 there may be seen a helical gear 93 driving a helical gear 94 on shaft 95. A crank member 96 is connected to the link 97, thereby transforming the rotational motion of the shaft 95 to vertical reciprocation. The raising of the member 90 is accomplished at a time when a needle 66 is positioned immediately below the master needle 100 so that upward motion of the bead 200 serves to engage the same with the master needle 100.

Figure 8:
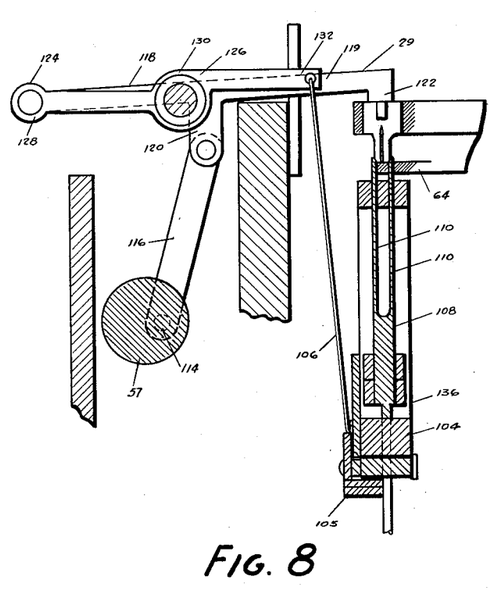
Figure 8 is an enlarged fragmentary sectional view as seen from the plane 8—8 on Figure 2.

The bead rejection means 29 serves to eject any bead 200 which because of faulty manufacture or accident has not become seated upon a needle 66 by the time the same is positioned near the master needle 100. If this has not occurred, it is apparent that when the member 90 is elevated the bead 200 will not engage the master needle 100 but will merely jam within the needle plate 52 possibly damaging the end of the master needle 100 at the same time. The rejection means 29 is therefore positioned at a point through which all of the bores 62 must pass prior to reaching the point at which the fork member 90 enters the same. Referring to Figure 8, there may be seen the mechanical linkage by means of which the desired result is accomplished. The reciprocally mounted structure 104 is generally similar to that of the means 24, the same being actuated by a push rod 106, to enable the fork 108 to move upwardly to engage a bead (not shown) where the same has not become fully seated. As is the case in the fork member 90, the member 108 includes a pair of tines 110 which are adapted to pass on either side of the needles 66. Driven from a free end of the shaft 57 is a radially mounted pin 114 to which there is connected a link member 116. The opposite end of the link member 116 is connected to a feeler member 118 at an extension portion 120 thereof. The main body portion 119 of the feeler member 118 is generally horizontally disposed, and has a feeler portion 122 disposed at one end thereof, the same being of a size to be capable of entering a bore 62 where a bead 200 has been properly seated upon a needle 66. The opposite end of the feeler member 118 is pivotally connected at 124 to a rocker arm member 126 at the terminal portion 128 thereof. The rocker arm member 126 is mounted at the central portion 130 thereof for rotation about a fixed horizontally disposed axis, while the opposite terminal 132 is engaged with the upper end of the push rod 106.

The operation of the means 29 under normal conditions is such that as the shaft 57 rotates the feeler member 118 will oscillate about an axis through the terminal 124, which is held at the upper limit by a spring (not shown). On the upper stroke, the feeler portion 122 will clear the bore 62 disposed therebeneath, while on the lower stroke the same will enter the bore provided the bead 200 is fully seated. When this is the case, there will be ample clearance at the top of the bore 62 to allow the feeler member 122 to enter the bore without obstruction. Where a bead 200 has failed to lodge upon a needle 66, the feeler portion 122 will be unable to enter the bore 62, so that when the link 116 is about to start its downward stroke the feeler member 18 will be forced to oscillate about the feeler portion 122 rather than the opposite terminal portion 124. Since the terminal 124 will then move downwardly, the rocker arm member 126 will pivot in a counterclockwise direction as seen on Figure 8, resulting in the rod 106 being pulled upwardly.

Figure 14:
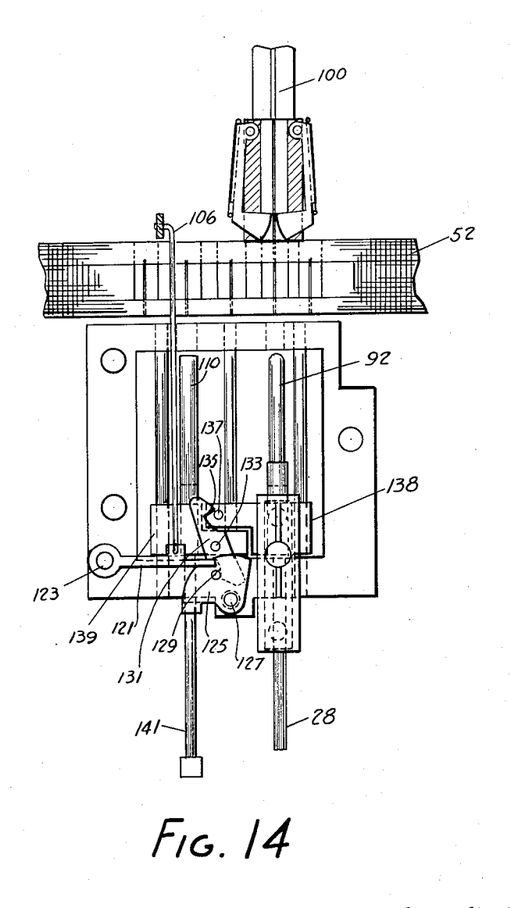
Figure 14 is an enlarged fragmentary view in elevation showing a portion of the bead rejection means which comprises a part of the device.

Referring to Figure 14 of the drawing, it will be observed that the rod 106 is connected at the lower end thereof to a horizontally disposed locking member 121, pivotally secured at point 123. The member 121 is engageable in a notch on the rotary member 125, which is pivotally mounted about point 127. The rotary member 125 has a projection 129 extending laterally thereof, the same engaging the lower part of a rocker arm 131, pivotally mounted at the central part thereof on a stud 133. At the upper part of the rocker arm 131 is a latch member 135, the same being engageable with a stud 137 on a vertically reciprocating member 138, whereby the vertically reciprocating member 139 is connected to the member 138 for vertical motion therewith.

The above described structure, brought into operation by upward motion of the member 106, operates as follows. Upon the disengagement of the locking member 121, the rotary member 125 pivots leftward as seen on Figure 14, wherein the projection 129 also moves in a leftward direction, in turn permitting the rocker arm which is spring loaded to rotate rightwardly as seen on Figure 14. The latch member 135 then engages the stud 137, by which time the defective bead disposed in the plate 52 has advanced the distance between successive beads so that on the following cycle of operations the tines 110 will rise to eject the defective bead from the plate. At the completion of the cycle, the members 138 and 139 return to the position shown on Figure 14, the member 141 striking a fixed portion of the device (not shown) to return the rotary member 128 to its original position, wherein the projection 129 rotates the rocker arm 131 to prevent reengagement of the latch 135 with the stud 137 until a second defective bead is encountered by the feeler member 118. It may be mentioned at this time that the member 138 reciprocates once for each cycle of operation to push a bead from the plate 52 onto the needle 100, and when the latch 135 is engaged the member 139 is driven by the member 138 to reject defective or improperly engaged beads prior to their reaching the point where the tines 92 would urge the same upwardly to damage the end of the needle 100.

Figure 11:
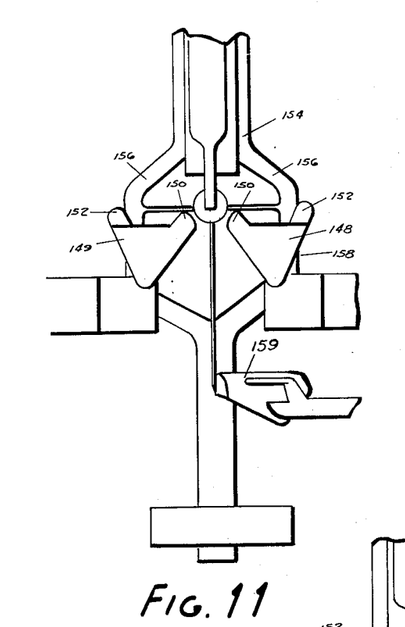
Figure 11 is an enlarged fragmentary view in elevation showing a first stage of a cycle of operation of the device.
Figure 12:
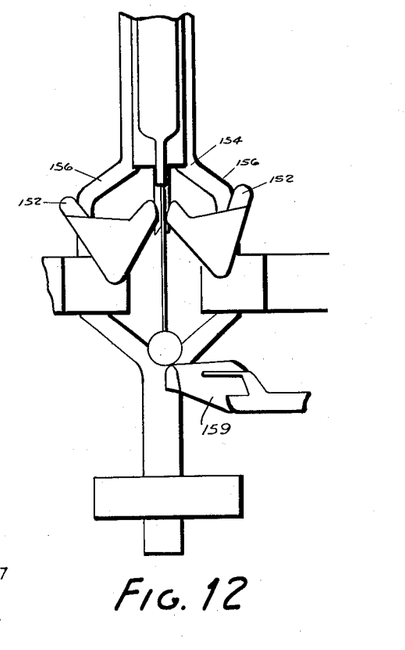
Figure 12 is an enlarged fragmentary view in elevation showing a second stage in the cycle of operation.
Figure 13:
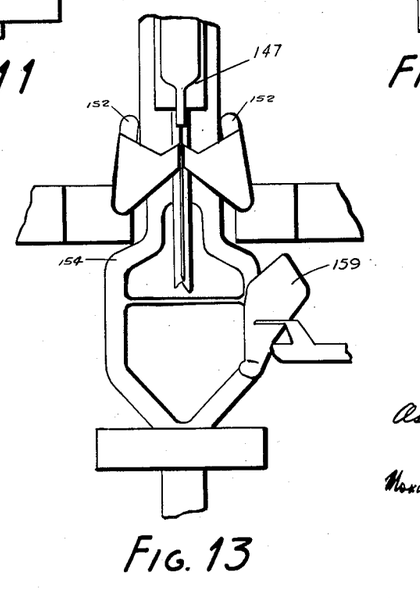
Figure 13 is a fragmentary view in elevation showing a third stage in the cycle of operation.

The master needle element 30 is disposed within a semicircular housing 140 (see Figure 3), the housing having a curved bead channel 142 disposed therein. The channel includes an entrance opening 144 thereto as well as an exit opening 146 therefrom. An exit gate 147 controls the flow of beads on the master needle 100, so that the same do not fall from the needle under the action of gravity. The needle 100 is also held by a pair of jaws 148 and 149, each of which includes a needle engagement portion 150 and a cam follower portion 152. The jaws 148 and 149 are driven by a double cam member 154 having a first operative face 156, and a holding face 158 (see Figure 11) which contacts each jaw. A needle support 159 supports the needle when the jaws are open (see Figures 11 and 12). The cam member 154 is also driven from the belt 57 through linkages (not shown).

The bead counting means 32 comprises essentially a microswitch connecting an electrical circuit leading to the control means 40. The contact tongue 172 (see Figure 3) extends in a path of the beads 200 as they move downwardly, so that the switch 170 is closed once for the passage of each bead 200, thus energizing a telephone type counter (not shown) which comprises a part of the control means 40. When a given number of beads has been counted, the control means actuates means to be subsequently described to sever the thread string and transfer the same from the master needle 100.

Figure 2:
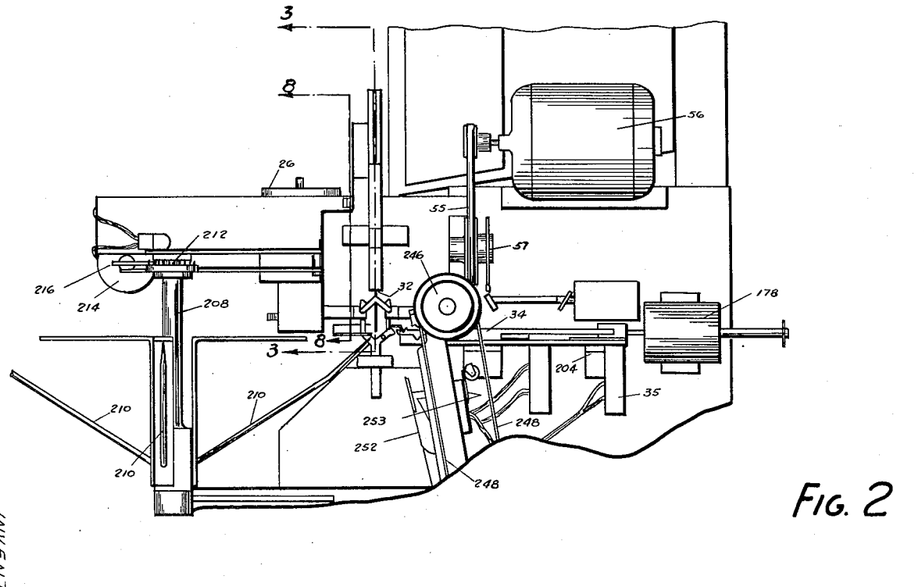
Figure 2 is a fragmentary enlarged elevational view corresponding to the upper portion of Figure 1.

The bead string transfer means 34 which is actuated by control means 40 when the desired number of beads is strung includes a shift rod 176 operated by a solenoid actuator 178 (see Figure 2).

Figure 9:
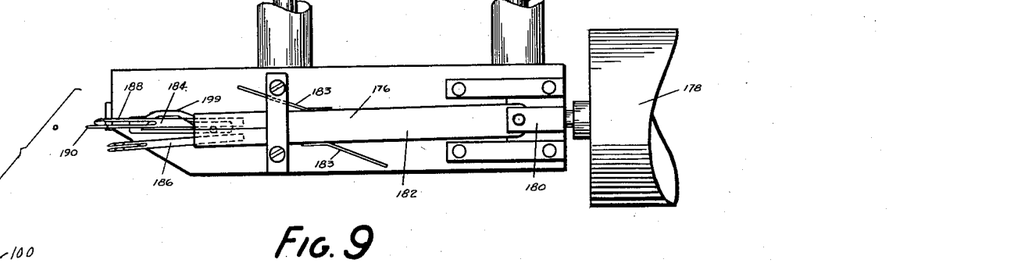
Figure 9 is an enlarged fragmentary plan view showing the transfer means whereby a complete string of beads is transferred from the engagement with the master needle, and a fresh string is engaged with said needle.
Figure 10:
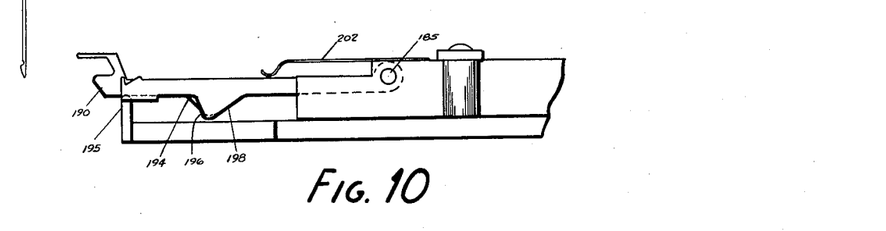
Figure 10 is a side elevational view of the transfer means showing in greater detail the structure of the left hand portion of Figure 9.

The shift rod unit 176 (see Figures 9 and 10) includes a solenoid-engaging link 180 and a pivotal link 182, the link 182 being cushioned for movement by leaf springs 183. The link 182 includes a bead string disengaging member 184 and a bead string re-engaging member 186. The member 184 includes a bifurcated portion 188 having a loop-engaging part 190 and a cam 194 which serves to lift a threaded string of beads from engagement with the lower end of the master needle 100. When the solenoid actuator 178 is energized, the unit 176 is moved forwardly until the part 190 engages the lop (not shown) on the upper end of the string of beads, immediately after which the cam 194 encounters the cam follower 195 and elevates the loop-engaging part 190, disengaging the loop of thread from the hook of the needle 100. Further movement in a leftward direction as seen on Figures 9 and 10 brings the loop over a retainer arm 210. At the end of the stroke the spring 183 pushes the shift rod 176 upward (see Figure 9). On the return stroke to the right as seen on Figures 9 and 10 the cam 199 serves to shift the unit 176 upwardly as seen on Figure 9 in order to bring a bead string re-engaging member 186 into contact with the lower end of the needle 100 to engage a fresh or unstrung length of bead stringing thread. The cams on the unit 176 are urged downwardly by a spring 202.

The bead string counting means 35 comprises essentially a microswitch 204 (see Figure 2) which is actuated with each leftward movement of the solenoid 178, as may be seen on Figure 2. The switch closing a circuit operates a second telephone counter (not shown) which comprises a part of the control means 40 and after a predetermined number of strings have been counted, the means 36 is rotated to position a successive retainer arm 210 to receive additional strings of beads.

The bead string retaining means 36 includes a central vertically disposed shaft 208 upon which there are mounted a plurality of retainer arms 210. Disposed at the upper end of the shaft 208 is a means for rotating the same, the means being actuated by a solenoid 214 and having a connecting link 216. This solenoid is also actuated by the control means 40 in turn controlled by the counting means 35. As the shaft 208 is periodically rotated, it is possible to remove a large number of strings from any given arm 210, without arresting the operation of the device, thereby permitting a constant rate of production to be maintained.

Figure 1:
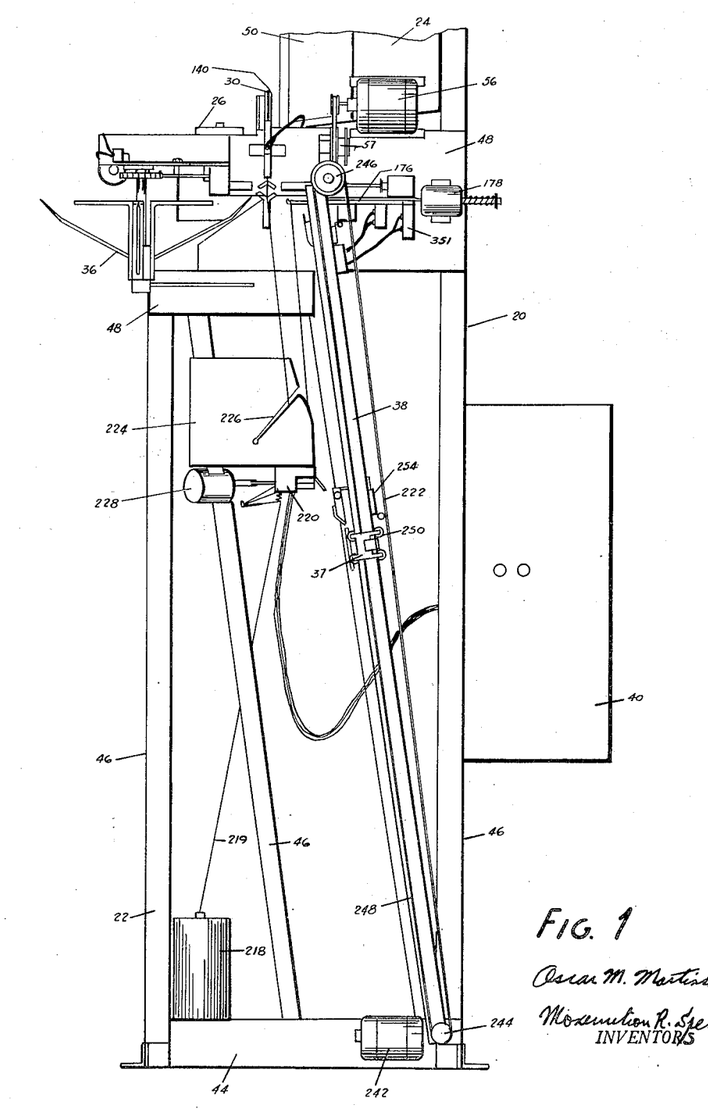
Figure 1 is a fragmentary front elevational view of an embodiment of the invention.

The master needle restringing means 38 is perhaps best seen on Figures 1 and 2, and includes a source of string 218, a severing and knotting unit 220 and a belt conveyor 222 (see Figure 1).

The severing and knotting unit 220 includes a guard plate 224 having a slot 226 therein. Since the length of string 219 being threaded at any given time extends through the slot 226, the same being of a width substantially less than a bead 200, the guard plate 224 serves to prevent the beads 200 being strung from reaching the point where the string is severed and knotted to form the lower end of the same.

The unit 220 is operated by a solenoid actuator 228 through linkage 230.

The belt conveyor unit 222 (see Figure 1) includes a prime mover 242, a lower pulley 244, and an upper pulley 246, between which a conveyor belt 248 is mounted. The carriage 250 rides upon the rail 38 and serves to convey a fresh length of string 219 to a point where it may be engaged by the rethreading member 186. The means 38 operates as follows. At the conclusion of the transfer of a thread 217 from the rethreading member 186 to the bottom of the master needle 100, the solenoid 178 returns the unit 176 to its rest position as shown on Figure 1. At this point, the control means 40 starts the prime mover 242 to result in the carriage 250 moving upwardly, carrying with it a fresh length of string 217 to deposit the same upon the member 186. When the carriage 250 has reached this position, the carriage strikes the receiver 252 which removes the loop in the end of the thread 219 from the carriage. A short interval of displacement later, the carriage strikes the upper microswitch 253 (see Figure 2) which closes a circuit causing the prime mover 242 to reverse its direction. At the start of the reverse direction, the receiver 252 removes the loop from the carriage 250 which then continues its downward travel until it strikes a lower microswitch 254, which opens a circuit causing the prime mover 242 to stop at its rest position, which position may be seen on Figure 1.

It may thus be seen that we have invented novel and highly useful improvements in a bead stringing method, together with an improved means for accomplishing this end. Through the use of the device, individual beads are rapidly spun to present a constantly changing portion of the outer surface of individual beads to a first or primary needle which aligns the axis of the bore disposed in the beads in a vertical position such that it may be readily transferred to a master needle. Owing to the construction of the transfer means and bead rotation means, a larger number of beads may be aligned at the same time, so that there is a constant supply of aligned beads traveling toward the master needle element to be positioned thereupon in ripid succession. Means is provided for the rejection of unaligned or defective beads so that these may be discarded without in any manner interfering with the operation of the machine. A high rate of production may be maintained over sustained periods without attention on the part of the operator, the device being capable of storing the strings of beads formed in a convenient manner until the same are manually removed. The device is substantially troublefree in operation and may be manufactured at a resonably low first cost.

We wish it to be understood that we do not consider the invention limited to the exact details of structure shown and set forth in this specification, for obvious modifications will occur to those skilled in the art to which the present invention pertains.

We claim:

1. A device for stringing beads comprising: bead supply means, bead transfer means and bead rotating means; said bead supply means serving to deliver beads to said transfer means; said bead rotating means serving to rotate beads positioned on said bead transfer means; said beads on said transfer means being capable of translational movement with respect to said bead rotating means, whereby said rotating means may rotate beads about an instantaneous axis, and movement of said beads with respect to said bead rotating means serves to rotate said instantaneous axis; said bead transfer means including a substantially circular needle plate having a plurality of peripherally disposed circular bores therein, each bore having an elongated needle centrally and vertically disposed at the lower end of said bore, said needle being engageable with the bore of a bead.

2. A device for stringing beads comprising: bead supply means, bead transfer means and bead rotating means; said supply means serving to advance beads singly to said transfer means; said bead rotating means serving to rotate beads positioned on said bead transfer means; said beads on said transfer means being capable of translational movement with respect to said bead rotating means whereby said rotating means may rotate beads about an instantaneous axis, and movement of said beads with respect to said bead rotating means serves to rotate said instantaneous axis; said bead transfer means including a substantially circular needle plate having a plurality of peripherally disposed circular bores therein, each bore having an elongated needle centrally and vertically disposed at the lower end of said bore, said needle being engageable with the bore of a bead; a master needle; said first mentioned needles being successively alingnable co-axially with said master needles.

3. A device for stringing beads comprising: bead supply means, bead transfer means and bead rotating means; said bead supply means serving to advance beads to said transfer means; said bead rotating means serving to rotate beads positioned on said bead transfer means; said beads on said transfer means being capable of translational movement with respect to said bead rotating means whereby said rotating means may rotate beads about an instantaneous axis, and movement of said beads with respect to said bead rotating means serves to rotate said instantaneous axis; said bead transfer means including a substantially circular needle plate having a plurality of peripherally disposed circular bores therein, each bore having an elongated needle centrally and vertically disposed at the lower end of said bore, said needle being engageable with the bore of a bead; a master needle; said first mentioned needles being successively alignable axially with said master needle; and means to slide said beads successively from said first mentioned needles to said master needle, as said first mentioned needles are positioned co-axially with said master needle.

4. A device for stringing beads comprising: bead supply means, bead transfer means and bead rotating means; said bead supply means serving to advance beads to said transfer means; said bead rotating means serving to rotate beads positioned on said bead transfer means; said beads on said transfer means being capable of translational movement with respect to said bead rotating means whereby said rotating means may rotate beads about an instantaneous axis, and movement of said beads with respect to said bead rotating means serves to rotate said instantaneous axis; said bead transfer means including a substantially circular needle plate having a plurality of peripherally disposed circular bores therein, each bore having an elongated needle centrally and vertically disposed at the lower end of said bore, said needle being engageable with the bore of a bead; a master needle; said first mentioned needles being successively alignable co-axially with said master needle; means to slide said beads successively from said first mentioned needles to said master needle, as said first mentioned needles are positioned co-axially with said master needle; a string operatively connected to said master needle at one end thereof, whereby beads transferred to said master needle may become threaded upon said string.

5. A device for stringing beads comprising: bead supply means, bead transfer means and bead rotating means; said bead supply means serving to advance beads to said transfer means; said bead rotating means serving to rotate beads positioned on said bead transfer means; said beads on said transfer means being capable of translational movement with respect to said bead rotating means whereby said rotating means may rotate beads about an instantaneous axis, and movement of said beads with respect to said bead rotating means serves to rotate said instantaneous axis; said bead transfer means including a substantially circular needle plate having a plurality of peripherally disposed circular bores therein and located so as to support a plurality of beads disposed in said bores to contact said bead rotating means, each bore having an elongated needle centrally and vertically disposed at the lower end of said bore, said needle being engageable with the bore of a bead; a master needle positioned adjacent said transfer means; said first mentioned needles being successively alignable co-axially with said master needle; means to slide said beads successively from said first mentioned needles to said master needle, as said first mentioned needles are positioned co-axially with said master needle; said means including a bifurcated reciprocably-mounted fork member successively engageable with said beads on either side of each of said first mentioned needles.

6. A device for stringing beads comprising: bead supply means, bead transfer means and bead rotating means; said bead supply means serving to advance beads to said transfer means; said bead rotating means serving to rotate beads positioned on said bead transfer means; said beads on said transfer means being capable of translational movement with respect to said bead rotating means whereby said rotating means may rotate beads about an instantaneous axis, and movement of said beads with respect to said bead rotating means serves to rotate said instantaneous axis; said bead transfer means including a substantially circular needle plate having a plurality of peripherally disposed circular bores therein and located so as to support a plurality of beads disposed in said bores to contact said bead rotating means, each bore having an elongated needle centrally and vertically disposed at the lower end of said bore, said needle being engageable with the bore of a bead; a master needle positioned adjacent said transfer means; said first mentioned needles being successively alignable coaxially with said master needle; means to slide said beads successively from said first mentioned needles to said master needle, as said first mentioned needles are positioned axially with said master needle; a string operatively connected to said master needle at one end thereof, whereby beads slid onto said master needle may become threaded upon said string; a pair of jaw members and a needle support alternately supporting said master needle while allowing successive beads to pass thereon.

7. A device for stringing beads comprising: bead supply means, bead transfer means and bead rotating means; said supply means serving to advance beads to said transfer means; said bead rotating means serving to rotate beads positioned on said bead transfer means; said beads on said transfer means being capable of translational movement with respect to said bead rotating means whereby said rotating means may rotate beads about an instantaneous axis, and movement of said beads with respect to said bead rotating means serves to rotate said instantaneous axis, said bead transfer means including a substantially circular needle plate having a plurality of peripherally disposed circular bores therein and located so as to support a plurality of beads disposed in said bores to contact said bead rotating means, each bore having an elongated needle centrally and vertically disposed at the lower end of said bore, said needle being engageable with the bore of a bead; a master needle positioned adjacent said transfer means; said first mentioned needles being successively alignable co-axially with said master needle; means to slide said beads successively from said first mentioned needles to said master needle, as said first mentioned needles are positioned co-axially with said master needle; a string operatively connected to said master needle at one end thereof, whereby beads slid to said master needles may become threaded upon said string; upper and lower jaw members alternately supporting said master needle while allowing successive beads to pass thereon; a needle support supporting said needle when said jaws are in a non-supporting position; means to automatically count the number of beads upon a given string, and means controlled by said counting means to remove a completely threaded string from engagement with said master needle.

8. A device for stringing beads comprising: a bead supply means, bead transfer means and bead rotating means; said supply means serving to advance beads to said transfer means; said bead rotating means serving to rotate beads positioned on said bead transfer means; said beads on said transfer means being capable of translational movement with respect to said bead rotating means whereby said rotating means may rotate beads about an instantaneous axis, and movement of said beads with respect to said bead rotating means serves to rotate said instantaneous axis, said bead transfer means including a substantially circular needle plate having a plurality of peripherally disposed circular bores therein and located so as to support a plurality of beads disposed in said bores to contact said bead rotating means, each bore having an elongated needle centrally and vertically disposed at the lower end of said bore, said needle being engageable with the bore of a bead; a master needle positioned adjacent said transfer means; said first mentioned needles being successively alignable co-axially with said master needle; means to slide said beads successively from said first mentioned needles to said master needle, as said first mentioned needles are positioned co-axially with said master needle; a string operatively connected to said master needle at one end thereof, whereby beads slid to said master needle may become threaded upon said string; upper and lower jaw members alternately supporting said master needle while allowing successive beads to pass thereon; means to automatically count the number of beads upon a given string; means controlled by said counting means to remove a completely threaded string from engagement with said master needle; and means adjacent said master needle to re-engage said master needle with successive strings which are free of beads.

9. A device for stringing beads comprising: bead supply means, bead transfer means and bead rotating means; said supply means serving to advance beads to said transfer means; said bead rotating means serving to rotate beads positioned on said bead transfer means; said beads on said transfer means being capable of translational movement with respect to said bead rotating means whereby said rotating means may rotate beads about an instantaneous axis, and movement of said beads with respect to said bead rotating means serves to rotate said instantaneous axis; said bead transfer means including a substantially circular needle plate having a plurality of peripherally disposed circular bores therein and located so as to support a plurality of beads disposed in said bores to contact said bead rotating means, each bore having an elongated needle centrally and vertically disposed at the lower end of said bore, said needle being engageable with the bore of a bead; a master needle positioned adjacent said transfer means; said first mentioned needles being successively alignable co-axially with said master needle; means to slide said beads successively from said first mentioned needles to said master needle, as said first mentioned needles are positioned co-axially with said master needle; said means including a bifurcated reciprocally mounted fork member successively engageable with said beads on either side of said first mentioned needles; and means adjacent said last mentioned means to reject defective beads before reaching said last mentioned means.

10. A device for stringing beads comprising: bead supply means, bead transfer means and bead rotating means; said supply means serving to advance beads to said transfer means; said bead rotating means serving to rotate beads positioned on said bead transfer means; said beads on said transfer means being capable of translational movement with respect to said bead rotating means whereby said rotating means may rotate beads about an instantaneous axis, and movement of said beads with respect to said bead rotating means serves to rotate said instantaneous axis; said bead transfer means including a substantially circular needle plate having a plurality of peripherally disposed circular bores therein and located so as to support a plurality of beads disposed in said bores to contact said bead rotating means, each bore having an elongated needle centrally and vertically disposed at the lower end of said bore, said needle being engageable with the bore of a bead; a master needle positioned adjacent said transfer means; said first mentioned needles being successively alignable axially with said master needle; means to shift said beads successively from said first mentioned needles to said master needle, as said first mentioned needles are positioned axially with said master needle; said means including a bifurcated reciprocally mounted fork member successively engageable with said beads on either side of said first mentioned needles; and second means adjacent said last mentioned means to reject beads which have not engaged said first mentioned needles.

11. A bead transfer means for use in conjunction with a bead-stringing machine comprising: a needle plate and means to rotate said needle plate about an axis; said needle plate having a plurality of bores therein, said bores being equally spaced about the peripheral portion of said plate; and a needle positioned in the center of each of said bores, said needles having an effective length shorter than that of said bores.

12. Means for transferring a thread from a needle and re-threading said needle, comprising: an elongated arm having a principal axis; means for moving said arm substantially along said axis; a loop-engaging part serving to lift said thread from engagement with said needle, and transfer the same; a loop-re-engaging part disposed substantially parallel to said loop-engaging part serving to re-engage a second thread with said needle; and cam means to elevate said loop-engaging part upon a forward movement of said arm and elevate said re-engaging part upon the reverse movement of said arm.

13. Means for transferring a thread from a needle and re-threading said needle comprising: an elongated arm having a principal axis; means for moving said arm substantially along said axis; a loop-engaging part serving to lift said thread from engagement with said needle and transfer the same; a loop-reengaging part disposed substantially parallel to said loop-engaging part serving to re-engage a second thread with said needle; cam means to elevate said loop-engaging part upon a forward movement of said arm and elevate said re-engaging part upon the reverse movement of said arm; and means to advance a plurality of threads singly to said rethreading member.

14. A rejection means for use in a bead stringing device for examining beads comprising: a plate having a bore; a needle disposed in said bore having an effective length substantially less than said bore; said beads being engageable in said bore and upon said needle; said beads when in an unengaged condition with respect to said needle projecting outwardly a distance further than when so engaged; a feeler member projectible into said bore, said feeler member being engageable with an improperly seated bead.

References Cited in the file of this patent

UNITED STATES PATENTS

| | | |
|---|---|---|
| 2,640,631 | Litterio et al. | June 2, 1953 |
| 2,641,389 | Bagdon | June 9, 1953 |
| 2,670,109 | Perry et al. | Feb. 23, 1954 |

FOREIGN PATENTS

| | | |
|---|---|---|
| 534,524 | France | Jan. 7, 1922 |
| 767,429 | France | Apr. 14, 1933 |